June 14, 1927.
F. O. HARTMAN
1,632,649
VARIABLE CONDENSER
Filed Nov. 23, 1925 3 Sheets-Sheet 1
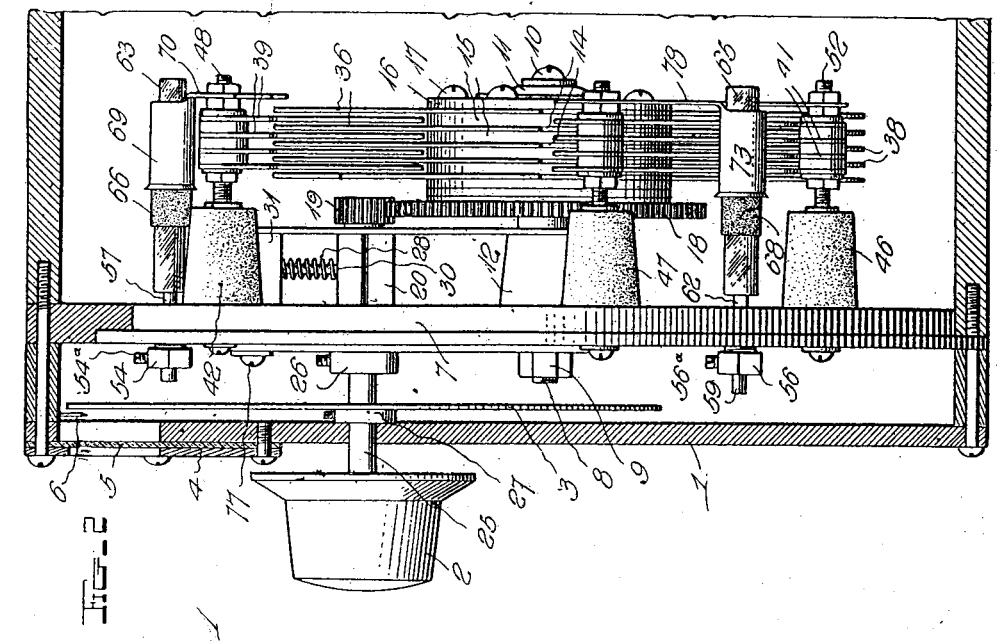
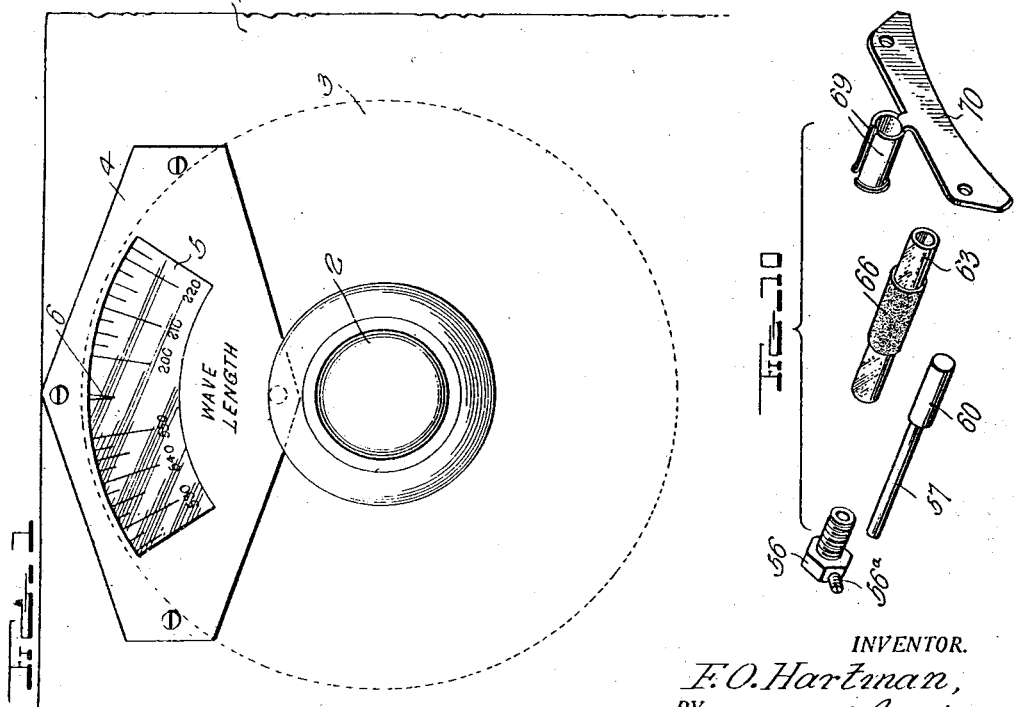
INVENTOR.
F. O. Hartman,
BY John O. Brady
ATTORNEY June 14, 1927.
F. O. HARTMAN
1,632,649
VARIABLE CONDENSER
Filed Nov. 23, 1925
3 Sheets-Sheet 2
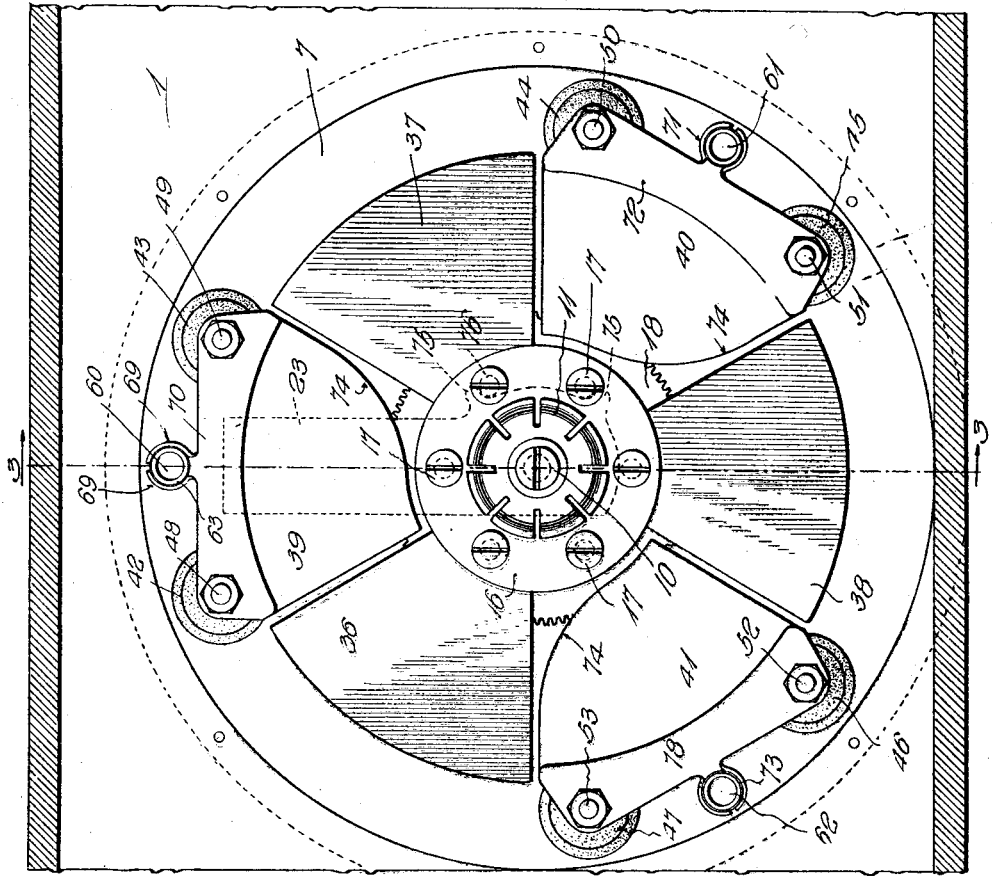
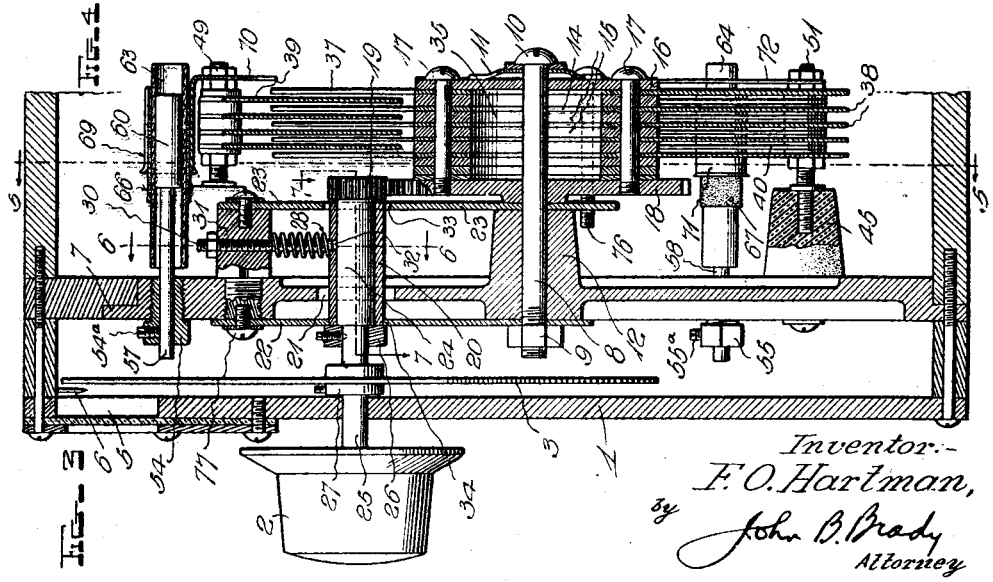
Inventor:-
F. O. Hartman,
by John B. Brady
Attorney June 14, 1927.
F. O. HARTMAN
1,632,649
VARIABLE CONDENSER
Filed Nov. 23, 1925
3 Sheets-Sheet 3
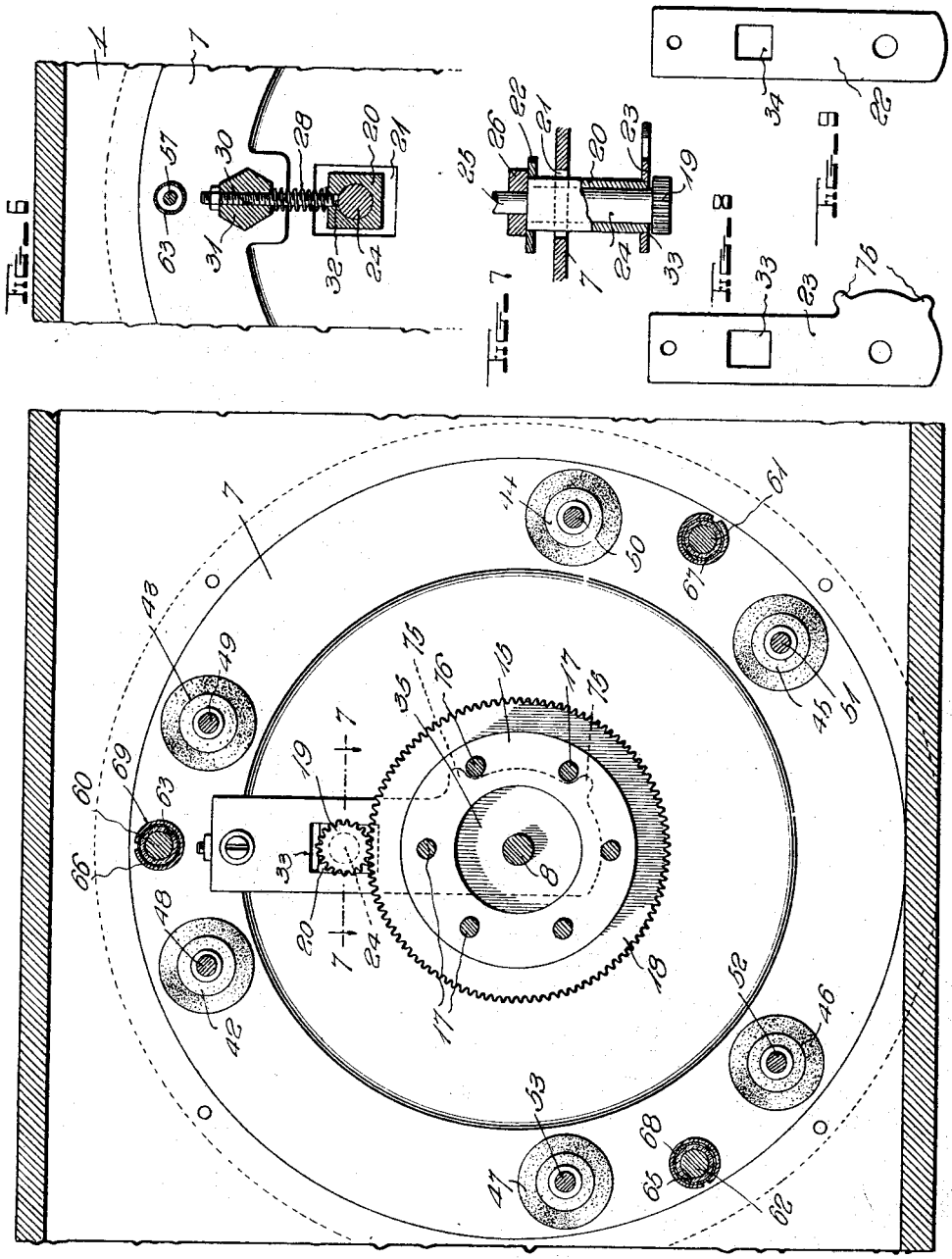
Inventor:-
F. O. Hartman,
by
John B. Brady
Attorney Patented June 14, 1927.

1,632,649

UNITED STATES PATENT OFFICE.

FRANK O. HARTMAN, OF MANSFIELD, OHIO, ASSIGNOR TO HARTMAN ELECTRICAL MANUFACTURING COMPANY, OF MANSFIELD, OHIO, A CORPORATION OF OHIO.

VARIABLE CONDENSER.

Application filed November 23, 1925. Serial No. 70,973.

My invention relates broadly to variable condensers and more particularly to a uni-control tuning system for the simultaneous control of a plurality of electrical circuits. One of the objects of my invention is to provide a practical construction of variable condenser for the uni-control of a plurality of electrical circuits, where adjustment can be made for the differences in the electrical tuning of each of the several circuits, with which the variable condenser may be associated.

Another object of my invention is to provide a variable condenser construction for the simultaneous control of a plurality of electrical circuits wherein a single rotor carries a plurality of sets of rotor plates which may be intermeshed in varying degrees with a plurality of sets of stator plates with independently adjustable variable capacity elements mounted adjacent each of the sets of stator plates, and bridging the cooperating sets of rotor and stator plates for permitting initial adjustment in the capacity values of each of the variable condenser sections for initially compensating for differences in electrical circuits which may be associated therewith.

Still another object of my invention is to provide a mounting for a control shaft in a multiple condenser unit by which accurate adjustment of the rotor may be made with respect to a plurality of sets of independent stator plates.

A still further object of my invention is to provide a construction of adjusting capacity element for initially fixing the capacity of each set of cooperating stator and rotor plates of a uni-control condenser system with respect to the electrical characteristics of the circuits in which the sets of plates are connected.

A still further object of my invention is to provide a mounting for a variable condenser system by which the rotation of a plurality of rotor plates under control of a common shaft may be limited to a particular angular displacement for controlling a number of electrical circuits simultaneously.

My invention further resides in the arrangement of a uni-control variable condenser unit which is capable of inexpensive manufacture on a quantity production basis. The condenser unit may be mounted in a radio receiver cabinet and the several electron tube circuits of the receiver are accurately controlled by the single adjustable unit. My invention will be more fully understood from the specification hereinafter following by reference to the accompanying drawings, in which:

Figure 1, is a front view of a portion of a radio receiver cabinet in which the uni-control variable condenser construction of my invention is mounted; Fig. 2 is a side elevation taken through the cabinet structure which is shown partially in cross-section and showing the parts of the variable condenser units; Fig. 3 is a cross-sectional view taken through the uni-control condenser construction on line 3—3 of Fig. 4, which is a rear view of the condenser construction; Fig. 5 is a cross-sectional view through the condenser taken on line 5—5 of Fig. 3; Fig. 6 is a fragmentary view showing the mounting for the control shaft of the variable condenser taken on line 6—6 of Fig. 3; Fig. 7 is a partial cross-sectional view of a fragmentary section along the control shaft of the variable condenser unit on line 7—7 of Figs. 3 and 5; Figs. 8 and 9 are views illustrating the journal means which I provide for mounting the control shaft and limiting the angular displacement of the rotor shaft of the variable condenser construction, and; Fig. 10 shows the disassembled parts of each of the auxiliary condensers for fixing the capacity relationship between the sets of stator and rotor plates.

Referring to the drawings in more detail, reference character 1 represents the panel of a receiving cabinet which is equipped with the uni-control radio receiving system of my invention. The control system is operated from a rotatable knob 2 on the end of a shaft which projects through the panel 1. The control shaft 25 carries a dial 3 mounted upon a bushing 27 which is secured to shaft 25 to make visible the calibrations on the dial 3 through the sight opening 5 in the frame member 4 which is secured to panel 1. A reference point 6 is provided against which the angular displacement of the control shaft 25 may be referred. A plate member 7 is provided on which the parts of the variable condenser construction are mounted. A stud member 8 is centrally positioned on the plate 7, through bushing 12 and rigidly secured therein by means of nut 9. A head 10 is provided on the stud 8, which engages spring washer 11 which bears against the end plate 16 of a plurality of alternate spacing plates 15 and condenser rotor plates 14. The stack of alternate spacing plates 15 and condenser rotor plates 14 are closed at the end opposite plate 16, by means of main gear 18, the stack being secured together by means of bolts 17. The space 35 interiorly of the spacing plates 15 and the condenser rotor plates 14 may be filled with lubricant to enable the rotor plates to be freely revolved around the central stud 8. The rotation is governed by means of spur gear 19, intermeshing with the main gear 18 and under control of the shaft 25. The shaft 25 has an enlarged portion 24 which is journaled in a bearing member 20, one end of which fits into an aperture 34 in the plate member 22, which is secured at the stud member 8, by means of nut 9 and by screw member 77, which is secured into the supporting block 31. In this manner the control shaft 25 is journaled at a definite spaced relationship with respect to the axis of rotation of the rotor plates. A bushing 26 is secured to shaft 25, to properly position the control shaft in the journal 20 with respect to the plate member 22. The opposite end of the journal 20 projects through an aperture 33 in a plate member 23, which extends between the stud 8 and the block 31 to properly position the control shaft with respect to the rotor plates. In order to allow sufficient lost motion in the control shaft and the gearing system, including spur gear 19 and main gear 18, the journal 20 may rock in the aperture 33, being limited in movement by means of a screw threaded member 30, which passes downwardly and has its end projecting into aperture 32 formed in the journal 20 with a spring 28 positioned between the block 31 and the journal 20. It will be observed that the journal 20 passes through aperture 21 in the plate 7 and permits movement of the journal 20 within limits to prevent binding of the gearing system and to permit slight variation in size of the parts in the processes of production. The two plates 22 and 23 are accurately made and serve to journal the control shaft with respect to the rotor, independent of slight variations which may exist in the main plate 7. The rotor plates comprise a plurality of sets of blades 36, 37, and 38 which project radially outwardly from the rotor plate portion 14 around the stud 8, each set of rotor plates being arranged to intermesh with independent sets of stator plates 39, 40 and 41. The plates may be cut, as represented at 74, in such manner that the capacity variation may follow any desired law.

Each of the sets of stator plates are mounted in spaced relationship on insulated bushings which are secured upon the plate 7. Stator plates 39 are secured in position on bushings 42 and 43 by means of projecting bolt members 48 and 49 on which the stator plates 39 are alternately positioned with spacing members therebetween. Similarly the stator plates 40 are mounted in spaced relationship on extending rods 50 and 51 mounted in bushings 44 and 45. The set of stator plates 41 are mounted in spaced relationship on insulated bushings 46 and 47 on rods 52 and 53 which project from the insulated bushings. The rotor plates 36, 37 and 38 inter-mesh with the corresponding sets of stator plates 39, 40 and 41, but it will be appreciated that the electrical circuits with which these sets of plates are associated may not be identical in their characteristics, so that the same angular distances through which each of the sets of stator and rotor plates are related may not produce the same capacity variation. In order to initially compensate for these differences and adjust the condenser for operation in a particular electrical system, I provide auxiliary condensers mounted adjacent each of the sets of stator plates and connected in shunt between the sets of rotor and stator plates.

In Fig. 3, I have illustrated the condenser which is adjacent the stator plates 39 as mounted in a bushing 54 which is screw threaded into the plate 7. The condenser consists of a rod member 57 having an enlarged annular portion 60 thereon which fits snugly into a glass tubular member 63, the exterior of which is coated with a suitable conductive coil 66. A stator plate 70 is secured adjacent the top plate of the set of stator plates 39 on posts 48 and 49 and is provided with a central tubular tongue which terminates in a pair of gripping faces 69 which embrace the outside of the conductive coil 66. The capacity of the condenser may be adjusted by sliding rod member 57 with respect to the conductive coating 66 by loosening and tightening set screw 54$^a$ in bushing 54.

Similarly I provide a plate 72 which is parallel with the plates in the set of stator plates 40 and which is mounted on posts 50 and 51 which support the stator plates 40. The integral central tongue 71 on the stator plate 72 surrounds the conductive plate 67 positioned on insulated tubular member 64 which houses the rod member 61. The rod 58 is adjustable in bushing 55 by loosening or tightening set screw 55$^a$. The stator plates 41 are provided with an auxiliary end plate 78 supported on posts 52 and 53. The auxiliary plate 78 has a central extension 73 formed into semi-circular tongues which grip the conductive plate 68 which is formed on the insulated tube 65 which in turn houses the enclosed portion 62 of rod member 59.

Rod member 59 is longitudinally adjustable in bushing 56 under control of the set screw 56ª.

In order to govern the angular rotation of the rotor plates I provide a stud 76 which projects from the rotor, the angular movement of which is limited by the circular distance between tongues 75 which extend from plate member 23. It will therefore be seen that plate member 23 serves as both a spacing element and as a means for limiting the angular displacement of the rotor plates.

The auxiliary condensers formed between the enlarged rod portions 60, 61 and 62 and the conductive plates 66, 68 and 67, respectively, may be initially set at the factory where the uni-control system is installed in the receiving circuit and set so that differences in the electrical tuning of the several circuits associated with the sets of stator and rotor plates may be compensated for. It will be understood that my invention may be constructed in any number of different forms and that, in illustrating one of its preferred embodiments, I intend no limitation upon the invention other than are imposed by the scope of the appended claims.

What I claim and desire to secure by Letters Patent of the United States is as follows:—

1. In a variable condenser construction, an auxiliary condenser mounted adjacent each of said sets of stator plates, said auxiliary condenser comprising an insulated tubular member, a conductive plate surrounding said tubular member, a connection between said conductive plate and one of the stator plates of each of said sets of stator plates, and a rod member extending through said insulated tubular member adjacent said conductive plate and connected with said sets of rotor plates, said rod member being adjustable with respect to said conductive plate for fixing the capacity relationship between said sets of stator and rotor plates.

2. A variable electrical condenser comprising a plurality of sets of rotor and stator plates, auxiliary variable capacity means mounted adjacent said sets of stator plates and comprising tubular condenser units having plates slidable with respect to each other for fixing the capacity relationship between said sets of stator and rotor plates, said tubular condenser units being constituted by one of said stator plates terminating in a tubular plate and a rod member concentrically positioned within said tubular plate and insulated therefrom and adjustable longitudinally with respect thereto.

3. A variable electrical condenser comprising a plurality of sets of rotor plates arranged to inter-leave with a plurality of sets of cooperating stator plates disposed substantially in the same plane therewith for simultaneously varying the mutual capacity relation between said cooperating sets of stator and rotor plates, and auxiliary variable capacity means mounted adjacent each of said sets of stator plates comprising a tubular condenser unit constituted by an adjustable rod member, and a tubular plate member surrounding said rod member, said tubular plate member being electrically connected with one of said stator plates.

4. A variable electrical condenser comprising a plurality of sets of rotor plates arranged to inter-leave with a plurality of sets of cooperating stator plates disposed substantially in the same plane therewith for simultaneously varying the mutual capacity relation between said cooperating sets of stator and rotor plates, and auxiliary variable capacity means mounted adjacent each of said sets of stator plates comprising variable condenser units constituted by an adjustable rod member and a portion of one of said stator plates, said rod member being relatively adjustable with respect to said portion of one of said stator plates for fixing the capacity relation between said sets of stator and rotor plates.

5. A variable electrical condenser comprising a plurality of sets of rotor plates arranged to inter-leave with a plurality of sets of cooperating stator plates disposed substantially in the same plane therewith for simultaneously varying the mutual capacity relation between said cooperating sets of stator and rotor plates, and auxiliary variable capacity means connected in shunt with said sets of stator and rotor plates comprising one of said stator plates and an adjustable rod member arranged to be moved with respect thereto for varying the capacity realtionship between said sets of stator and rotor plates.

6. A variable electrical condenser comprising a plurality of sets of rotor plates arranged to inter-leave with a plurality of sets of cooperating stator plates disposed substantially in the same plane therewith for simultaneously varying the mutual capacity relation between said cooperating sets of stator and rotor plates, said stator plates comprising groups of parallel plates substantially insulated from said rotor plates and having an end plate smaller in area than the area of the other stator plates comprising each group of stator plates, said end plate having a central tubular extension thereon, a tubular condenser unit mounted adjacent each set of stator plates and constituted by said extension and by an independently adjustable rod member arranged to be longitudinally moved with respect to said extension for adjusting the capacity relationship between said sets of stator and rotor plates.

7. A variable electrical condenser comprising a plurality of sets of rotor plates arranged to inter-leave with a plurality of sets of cooperating stator plates disposed substantially in the same plane therewith for simultaneously varying the mutual capacity relation between said cooperating sets of stator and rotor plates, said stator plates comprising groups of flat plates extending radially inwardly toward the center of said sets of rotor plates, and each group having an end plate of smaller size than the other plates constituting said groups, with the end plate thereof terminating in a tubular extension bent at substantially 90° to the plane of said stator plates and an adjustable rod member positioned within, but insulated from, said stator plates and connected with said rotor plates for forming an adjustable capacity between said sets of rotor and stator plates for controlling the capacity relationship therebetween.

8. A variable electrical condenser comprising a plurality of sets of rotor plates arranged to inter-leave with a plurality of sets of cooperating stator plates disposed substantially in the same plane therewith for simultaneously varying the mutual capacity relation between said cooperating sets of stator and rotor plates, each of said sets of stator plates comprising groups of parallel plate members extending inwardly toward the center of said rotor plates, with the end plate of each group having an area smaller than the area of the remaining plates of the group, an extension formed on said end plate, constituting one side of a variable electrical condenser, and a conducting member electrically connected with said rotor plates and arranged adjacent said extension on said end plate and adapted to be adjusted with respect thereto for varying the capacity relationship between said stator and rotor plates.

9. A variable condenser construction comprising a plurality of sets of stator plates, a plurality of sets of rotor plates arranged to inter-leave therewith, said sets of stator plates being mounted in groups insulated one from another on a common supporting plate, means carried by said common supporting plate on which said rotor plates are journaled, and an auxiliary condenser positioned on said common supporting plate adjacent each of said sets of stator plates and connected in shunt with said sets of stator and rotor plates for fixing the capacity relation therebetween.

10. In a rotatable variable condenser a supporting plate, a rotor carried by said supporting plate, sets of rotatable condenser plates extending from said rotor, sets of stator plates insulatingly carried by said supporting plate at points around said rotor plates in such manner that said rotor plates may be inter-leaved therewith, bushings carried by said supporting plate adjacent each of said sets of stator plates, and auxiliary condenser units positioned between said bushings and said sets of stator plates for adjusting the capacity relation between said sets of rotor and stator plates.

11. In a rotatable variable condenser a supporting plate, a rotor carried by said supporting plate, sets of rotatable condenser plates extending from said rotor, sets of stator plates insulatingly carried by said supporting plate at points around said rotor in such manner that said rotatable plates may be inter-leaved therewith, rod members passing through said supporting plates at substantially right angles to the plane of said stator plates, a tubular member carried by one of said stator plates, said tubular member being concentrically positioned about said rod member whereby an auxiliary condenser is formed between each of said sets of rotor and stator plates for adjusting the capacity relationship therebetween.

12. A variable condenser construction comprising a plurality of sets of rotor plates carried by a common rotatable shaft, a supporting plate in which said shaft is journaled, insulating means positioned around said supporting plate, sets of independent stator plates carried by said insulating means, bushings carried by said supporting plate adjacent said insulating means, rod members passing through said bushings and longitudinally adjustable therein, an inclosing portion carried by each of said rod members, a dielectric casing surrounding said enlarged portion, a tubular member connected with one of the stator plates of each of said sets of stator plates and surrounding said dielectric casing forming a condenser connected in shunt with each of said sets of stator and rotor plates for adjusting the capacity relationship therebetween.

FRANK O. HARTMAN.